(12) United States Patent
Masuda et al.

(10) Patent No.: US 6,745,190 B2
(45) Date of Patent: Jun. 1, 2004

(54) MEMBER MANAGEMENT SYSTEM

(75) Inventors: Shoji Masuda, Tokyo (JP); Takeshi Sato, Tokyo (JP); Masayuki Shimazu, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 434 days.

(21) Appl. No.: 10/008,190

(22) Filed: Nov. 13, 2001

(65) Prior Publication Data

US 2002/0087581 A1 Jul. 4, 2002

(30) Foreign Application Priority Data

Nov. 16, 2000 (JP) ........................................ 2000-350226

(51) Int. Cl.[7] .............................................. G06F 17/30
(52) U.S. Cl. ........................... 707/10; 707/9; 707/104.1
(58) Field of Search ..................... 707/1–10, 100–104.1; 705/1–9, 10–11, 14, 16, 22–23, 26–29, 36, 404; 235/375, 380, 382, 382.5

(56) References Cited

U.S. PATENT DOCUMENTS

| | | | | |
|---|---|---|---|---|
| 5,797,515 A | * | 8/1998 | Liff et al. ....................... 221/2 |
| 5,848,408 A | * | 12/1998 | Jakobsson et al. .............. 707/3 |
| 5,999,908 A | * | 12/1999 | Abelow ......................... 705/1 |
| 6,129,274 A | * | 10/2000 | Suzuki ........................ 235/381 |
| 6,249,772 B1 | * | 6/2001 | Walker et al. ................ 705/26 |
| 6,609,106 B1 | * | 8/2003 | Robertson .................... 705/26 |
| 6,618,730 B1 | * | 9/2003 | Poulter et al. .............. 707/102 |
| 6,694,315 B1 | * | 2/2004 | Grow .......................... 707/10 |

* cited by examiner

*Primary Examiner*—Greta Robinson
*Assistant Examiner*—Linh Black
(74) *Attorney, Agent, or Firm*—Ladas & Parry

(57) ABSTRACT

In a member managing system including a plurality of store terminals provided to a plurality of stores, respectively, in which customers purchase a product and a server for managing member information of registered customers of the customer, the registered customer being registered as the members, the server centralizes and stores the member information sent from the plurality of stores for each of the members in the member information database and sends the member information stored in the member information database to a store of the plurality of stores based on the request from a store terminal of the store, the store terminal being one of the plurality of store terminals.

6 Claims, 15 Drawing Sheets

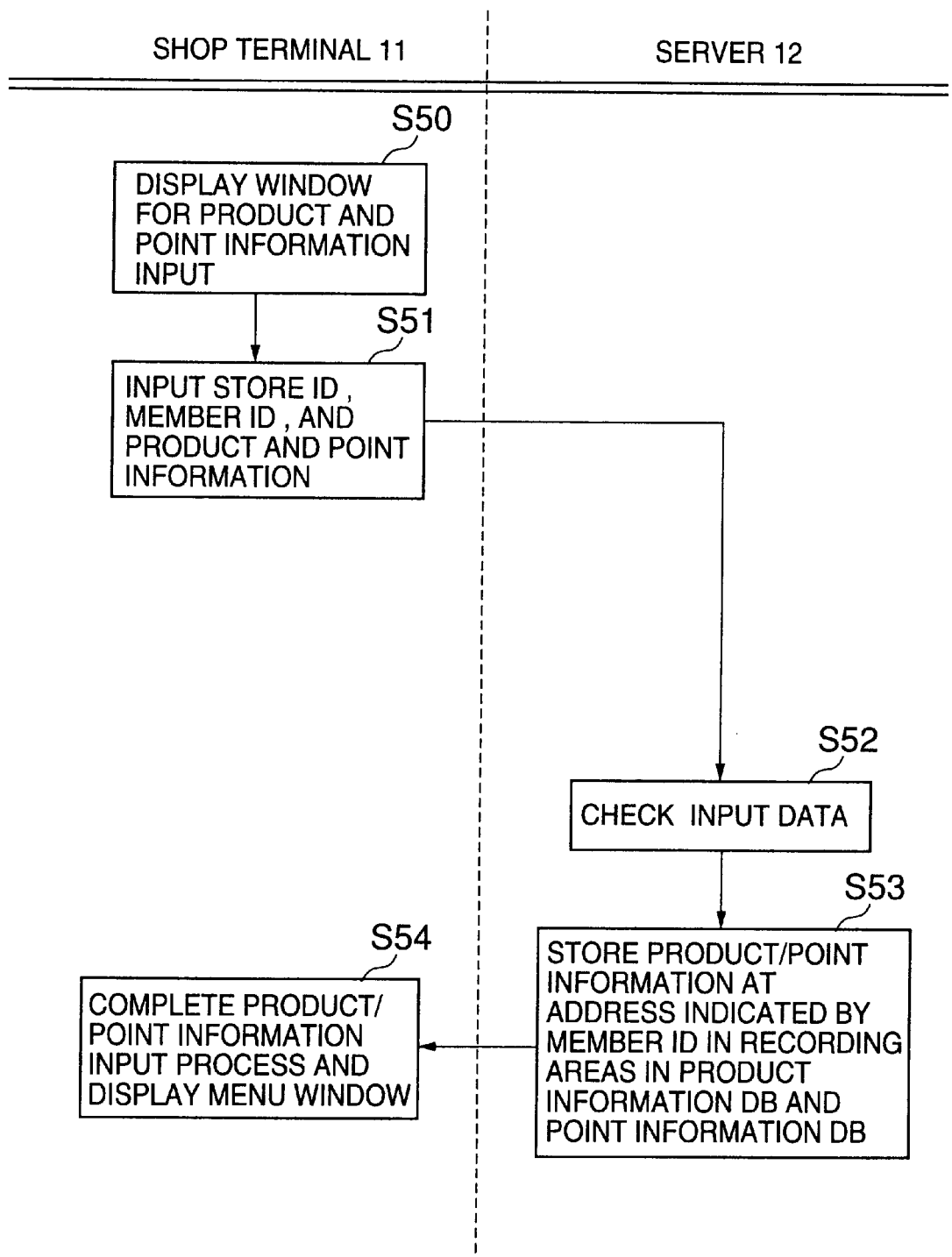

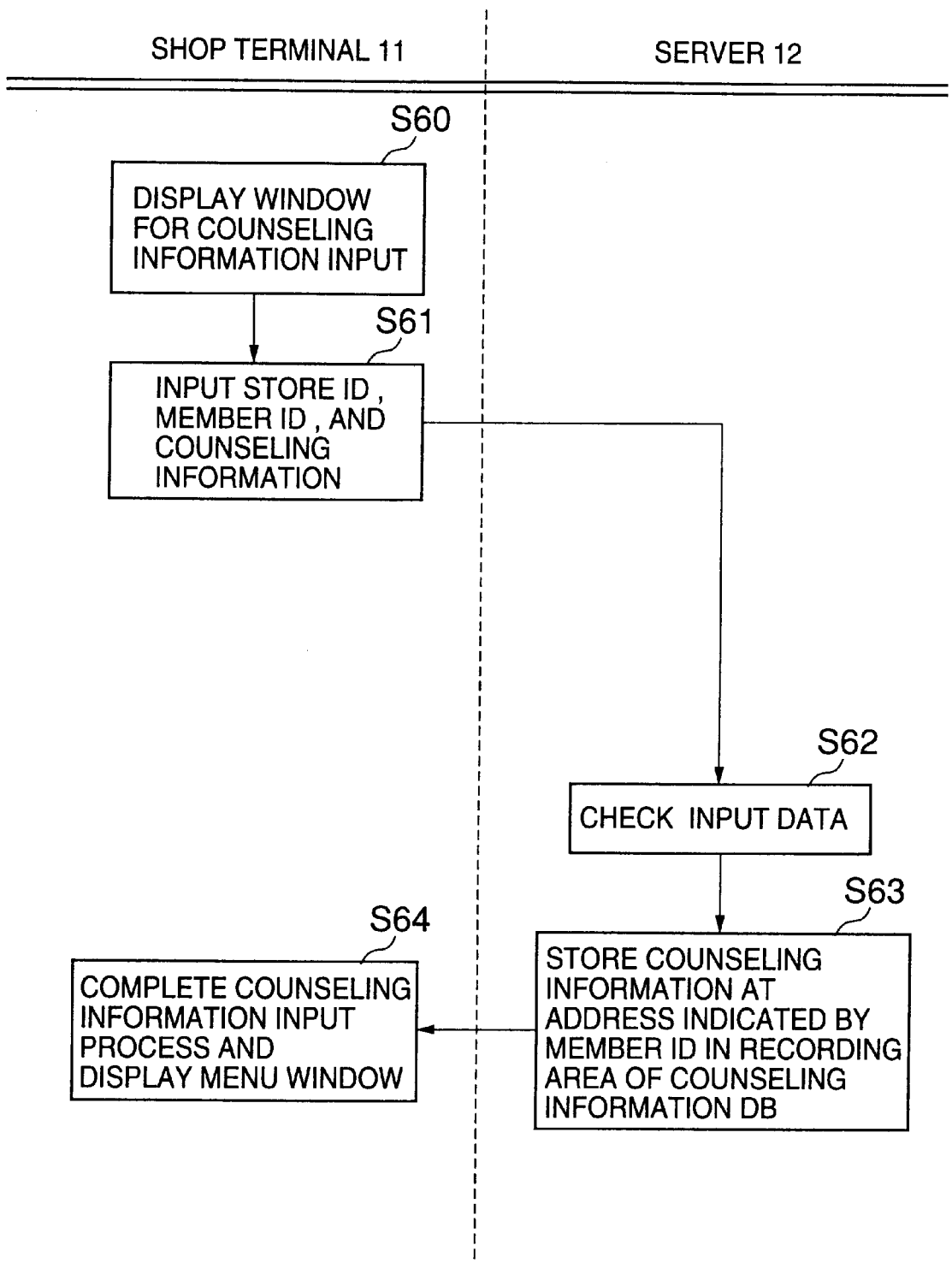

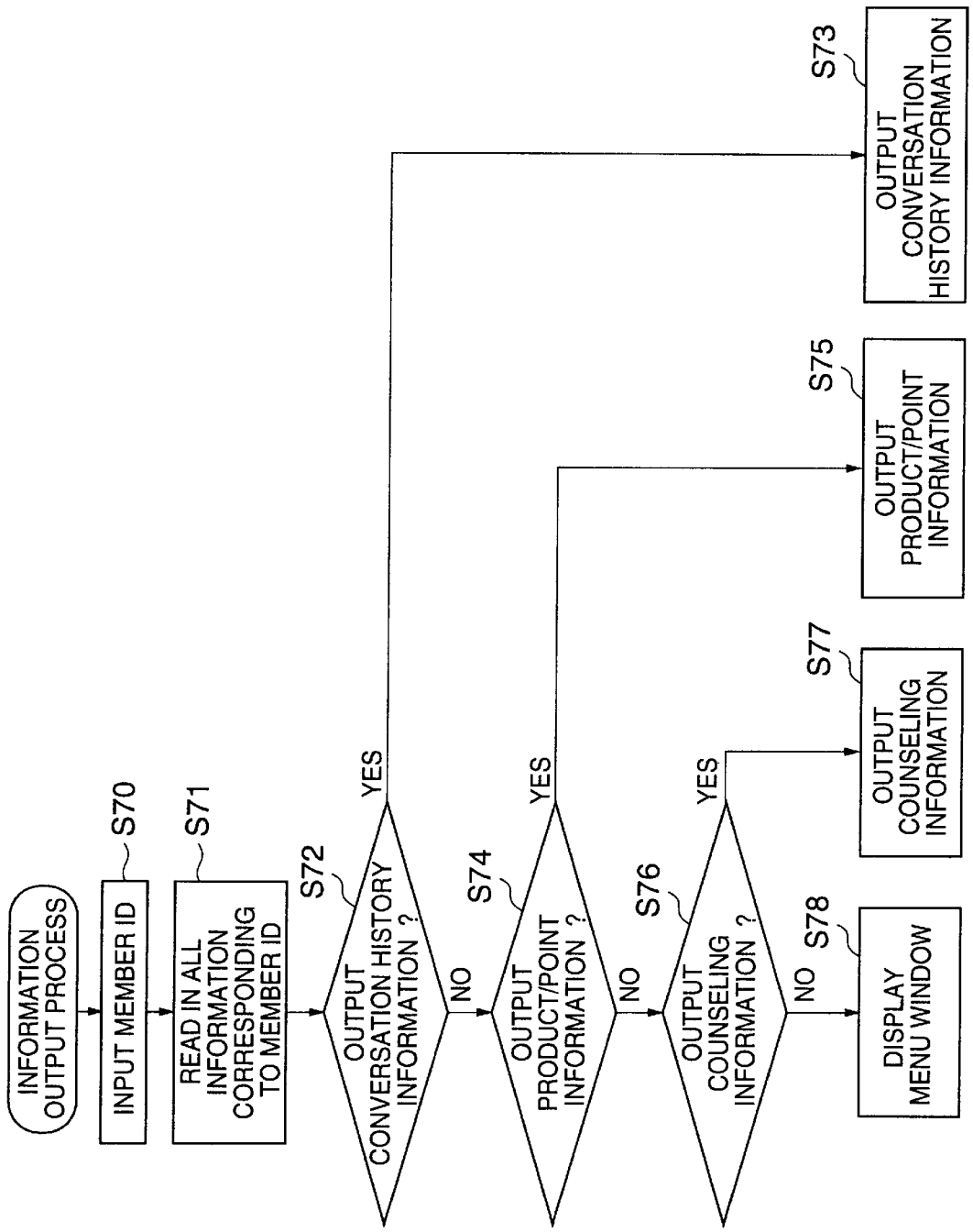

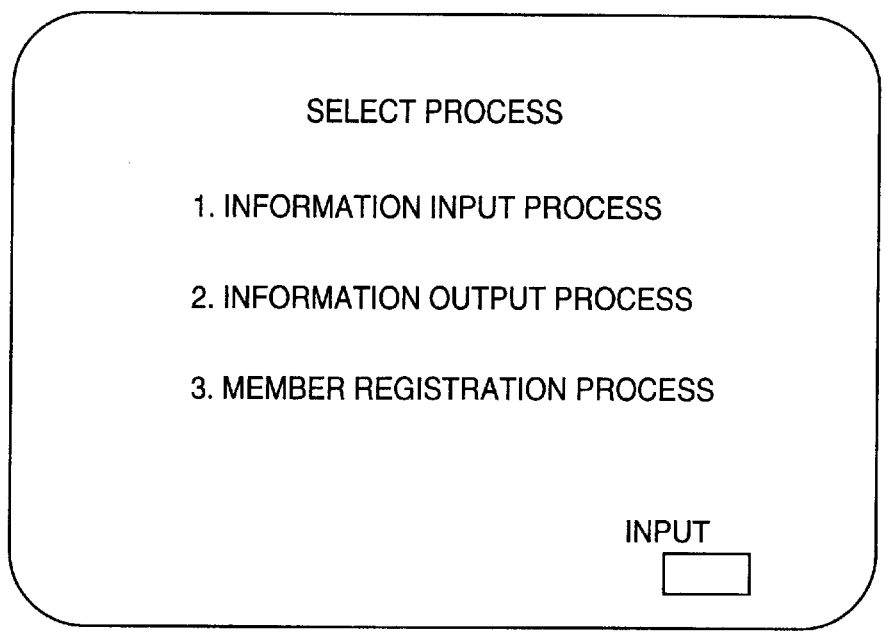

FIG.15

PRODUCT/POINT INFORMATION INPUT

1. PLEASE INPUT MEMBER ID

2. PLEASE INPUT INFORMATION OF PURCHASED PRODUCT

PURCHASE DATE ☐ YEAR ☐ MONTH ☐ DAY

PURCHASE LIST

| | | |
|---|---|---|
| W LOTION | ¥1200 | 10 POINTS |
| UV CUT L | ¥2000 | 20 POINTS |

FIG.16

COUNSELING INFORMATION INPUT

1. PLEASE INPUT MEMBER ID

2. PLEASE INPUT COUNSELING INFORMATION

COUNSELING DATE ☐ YEAR ☐ MONTH ☐ DAY

COUNSELING CONTENT

Q→ WANT TO GET A SUNTAN BUT WORRY ABOUT FRECKLES
A→ COUNSELED ABOUT ULTRAVIOLET COUNTERPLAN

FIG.19

PRODUCT/POINT HISTORY OF INDICATED MEMBER IS DISPLAYED

MEMBER NAME: ○○△△

ID: AB123456

| PURCHASE DATE | PRODUCT NAME | AMOUNT OF MOMBY | POINTS |
|---|---|---|---|
| 19/12/1999 | W LOTION | 1200 | 12 |
|  | UV CUT L | 2000 | 20 |
| 10/02/2000 | LIPSTICK | 3500 | 35 |
|  | FOUNDATION | 3000 | 30 |
| 09/03/2000 | W LOTION | 1200 | 12 |

ACCUMULATED POINTS: 109 POINTS

FIG.20

COUNSELING HISTORY OF INDICATED MEMBER IS DISPLAYED

MEMBER NAME: ○○△△

ID: AB123456

19/12/1999 Q→ WANT TO GET A SUNTAN BUT WORRY ABOUT FRECKLES
A→ COUNSELED ABOUT ULTRAVIOLET COUNTERPLAN

10/02/2000 Q→ SKIN LIKELY TO BE DRIED
A→ COUNSELED ABOUT MOISTURE CARE

MEMBER MANAGEMENT SYSTEM

BACKGROUND OF THE INVENTION

1. Field of the Invention

The present invention generally relates to a member management system, and more particularly to the member management system that conducts a member management using a store terminal provided in a store.

2. Description of the Related Art

Generally, when a maker sells products at a store, a customer registers as a member. Then, various services, such as points corresponding to a purchase amount, a preferential introduction of a new product, or a like, are conducted for the member. In addition, in each store and a maker side, various information collected from each member is reflected to a product development and a product promotion. Conventionally, a member registration is conducted at each store.

In a case in which a cosmetics product is exampled as a product, a conventional member management method will now be described with reference to FIG. 1. As shown in FIG. 1, a cosmetics maker 1 has contracted with a plurality of stores 2A through 2C. For example, the store 2A is a private store, the store 2B is a drug store, and the store 2C is a department store.

In order for a customer 3 (specifically referred to as members 3A through 3C) to register as a member of the cosmetics maker 1, the customer 3 visits any one of stores 2A through 2C and then a necessary procedure is conducted. When the customer 3 registers as the member, the customer 3 fills in necessary items of a registration form. In detail, the customer 3 fills in items of name, contact information, attributes (birthday, occupation, unmarried/married, days off, and a like), various information (hobby, yes or no of skin trouble, and a like) referred when the customer 3 purchases the product.

At each of stores 2A through 2C, based on the registration form filled out by the customer 3, each of member management sheets 4A through 4C is created for each member. In addition to information from the registration form filled out by the customer 3, each of the member management sheets further includes items for a date when the member visits after the member registration, a product which the member purchased, a conversation content and a counseling content provided by a sales person to the member when the member purchased the product, or a like to fill in. In the stores (the drug store and the department store) 2B and 2C, a POS (Point Of Sale) is installed to input information corresponding to the member management sheets 4B and 4C, respectively, and then, each computer 5 stores relative information.

Accordingly, by creating and referring to each of the member management sheets 4A through 4C for each member, a replacement cycle of a cosmetics product, a basic profile related to a makeup, and a like can be seen for each of members 3A through 3C. Moreover, the conversation content and the counseling content previously provided by a sales person to the member when the member purchased can be seen from the member management sheets 4A through 4C. Consequently, a new conversation and a new counseling are properly performed when the members 3A through 3C visit the stores 2A through 2C at a next time.

Moreover, in each of the stores 2A through 2C, a statistics process is conducted for the member management sheets 4A through 4C periodically. Each of the stores 2A through 2C has a plurality of members. Accordingly, by conducting the statistics process for the member sheets 4A through 4C, an overall sales trend of the product (for example, information indicating that cosmetics related to skin whitener are purchased more, or a like), a product purchase age group (for example, information indicating of which age group members mainly purchase the product, or a like), a price range of the most purchased product (for example, information indicating in which price range the product can be sold at the highest volume), and a like can be seen.

As an advantage for the member registration, points corresponding to a money amount of the product that the customer 3 purchased is given to the customer 3 and then a point reserve service corresponding to an accumulated point number is performed. Conventionally, this point management as described above is performed at each of the stores 2A through 2C.

However, in the conventional member management method, since the member management is performed by each of the stores 2A through 2C separately, an accuracy of information obtained from each member registered at each of the stores 2A through 2C is not sufficient. Thus, it is difficult to provide a service with higher quality to the members 3A through 3C. Details of a difficulty as described above will now be described with reference to FIG. 2.

In FIG. 1, one example is described in which three different members 3A through 3C visit three different stores 2A through 2C, respectively, and then register as members. On the other hand, in FIG. 2, another example is described in which a single customer 3 visits each of the stores 2A through 2C and registers as a member at each of the stores 2A through 2C.

Recently, many types of stores sell cosmetics. The stores 2A through 2C such as the private store, the drug store, and the department store, and other types of stores sell cosmetics. Since a customer base depends on the store type, each store decides a product line and arranges products to display based on the store type.

Accordingly, the same customer 3 purchases a cleansing cream that is a relatively cheaper product, at the drug store in neighborhood and purchases whitening cosmetics that is a relatively more expensive product, at the department store. Moreover, the customer 3 needs to register as a member at each store where the customer 3 purchases cosmetics products.

As shown in FIG. 2, it is assumed that the customer 3 purchases a cosmetics product as follows at the store 2A and registers as a member:

purchase date: March 1st
purchase product: face lotion "a"
counseling content: dry-rough-skin care
conversation content: overseas trip for diving, soon
point of purchase: 15 points.

In the store 2A, the member management sheet 4A is created based on the registration form filled out by the customer 3 and the purchase date (March 1st), the purchase product (face lotion "a"), the counseling content (dry-rough-skin care), and the conversation content (overseas trip for diving, soon) are additionally input. The member management sheet 4A is maintained by the store 2A.

After that, instead of visiting the store 2A, the customer 3 visits the store 2B different from the store 2A, purchases a cosmetics product as follows, and then the customer 3 registers as a member, again:

purchase date: June 1st purchase product: face lotion "b"

counseling content: ultraviolet counterplan conversation content: canceled overseas trip point of purchase: 10 points.

In the store 2B, the member management sheet 4B is created based on the registration form filled out by the customer 3 and the purchase date (June 1st), the purchase product (face lotion "b"), the counseling content (ultraviolet counterplan), and the conversation content (canceled overseas trip) are additionally input. The member management sheet 4B is maintained by the store 2B.

After that, instead of visiting the stores 2A and 2B, the customer 3 visits the store 2C different from the stores 2A and 2B, purchases a cosmetics product as follows, and then the customer 3 registers as a member, again:

purchase date: September 1st purchase product: face lotion "c"

counseling content: fine wrinkle counterplan conversation content: won in a tennis tournament point of purchase: 10 points.

In the store 2C, the member management sheet 4C is created based on the registration form filled out by the customer 3 and the purchase date (September 1st), the purchase product (face lotion "c"), the counseling content (fine wrinkle counterplan), and the conversation content (won in a tennis tournament) are additionally input. The member management sheet 4C is maintained by the store 2C.

It is assumed that after that, the customer 3 visits the store 2A on December 1st, again, and purchases another cosmetics product "2a". In this case, a salesperson of the store 2A corresponds to and counsels the customer 3 as a member, based on the member management sheet 4A based on purchase data as of March 1st and the member registration.

That is, the customer 3 actually changed a cosmetics type from the cosmetics product "a" to the cosmetics product "b" and further to the cosmetics product "c". However, the salesperson misjudges that the customer 3 still uses the same cosmetics product "a".

Similarly, as for counseling, even though the customer 3 is counseled for the ultraviolet counterplan and the fine wrinkle counterplan, the salesperson misjudges that the customer 3 needs a counsel only for a dry-rough-skin care. Furthermore, the salesperson can know only about information as of March 1st. Thus, the salesperson may incorrectly ask the customer, "How was your overseas trip?"

Furthermore, even though the point of purchase for the customer 3 is totally 35 points, only 15 points are accumulated available for the store 2A.

As described above, in the conventional member management method, the customer 3 may register as a member many times at the stores 2A through 2C. In this case, information related to the customer 3 is spread to the stores 2A through 2C. Thus, the accuracy of the information related to the customer 3 becomes lower at each of the stores 2A through 2C. Accordingly, because of a lower accuracy of the information at each of the stores 2A through 2C, the information at the lower accuracy is transmitted to the cosmetics maker 1. Consequently, the cosmetics maker 1 cannot properly conduct a development plan of a new product, a sales promotion plan, and a like.

Also, since in each of the stores 2A through 2C, a salesperson corresponds to and counsels the customer 3 as a member, based on each of the member management sheets 4A through 4C, it is difficult to obtain accurate information related to the customer 3. Accordingly, proper services, such as a proper conversation, a proper counseling, and a like), cannot be performed for the customer 3. Moreover, since the point of purchase is maintained at each of the stores 2A through 2C, total purchase points of purchase of the stores 2A through 2C cannot be considered. Consequently, a service of a point reduction is not sufficiently performed for the customer 3.

SUMMARY OF THE INVENTION

It is a general object of the present invention to provide a system for managing members in which the above-mentioned problems are eliminated.

A more specific object of the present invention is to provide the system for managing members in which an accuracy of information obtained from each member can be improved and a high quality service to the member can be provided.

The above objects of the present invention are achieved by a system for managing members including: a plurality of store terminals provided to a plurality of stores, respectively, in which customers purchase a product; and a server for managing member information of registered customers of the customer, the registered customer being registered as the members, wherein: the store terminal includes: a part conducting a member registration for the customers; a part obtaining the member information of the members; a part requesting the member information of the server; and a part outputting the member information sent from the server that corresponds to a request of the member information, the server includes: a store information database storing store information of each of the plurality of stores; a member information database storing the member information; a part centralizing and storing the member information sent from the plurality of stores for each of the members in the member information database; and a part sending the member information stored in the member information database to a store of the plurality of stores based on the request from a store terminal of the store, the store terminal being one of the plurality of store terminals.

According to the present invention, even if the member registration is conducted at the plurality of different stores and the member purchases product at the plurality of different stores, the server centralizes the member information sent from the store terminal provided at each of the stores and stores in the member information database provided in server for each member (that is, the member information is grouped for each member).

Therefore, even if the member information related to the same member is input and sent to the server separately from the different stores, the member information is not be duplicated. Accordingly, it is possible to improve the accuracy of the member information.

BRIEF DESCRIPTION OF THE DRAWINGS

Other objects, features and advantages of the present invention will become more apparent from the following detailed description when read in conjunction with the accompanying drawings, in which:

FIG. 8 is a flowchart for explaining a product/point information input process;

FIG. 9 is a flowchart for explaining the counseling information input process;

FIG. 10 is a flowchart for explaining the information output process. In the information output process;

FIG. 11 is a diagram showing an example of the menu window;

FIG. 12 is a diagram showing an example of the registration window;

FIG. 15 is a diagram showing an example of a product/point information input window;

FIG. 16 is a diagram showing an example of a counseling information input window;

FIG. 19 is an example of a product/point information output window displayed at the display part; and FIG. 20 is a diagram showing an example of a counseling information output window displayed at the display part.

DESCRIPTION OF THE PREFERRED EMBODIMENTS

An embodiment according to the present invention will now be described with reference to figures.

Figure 1:
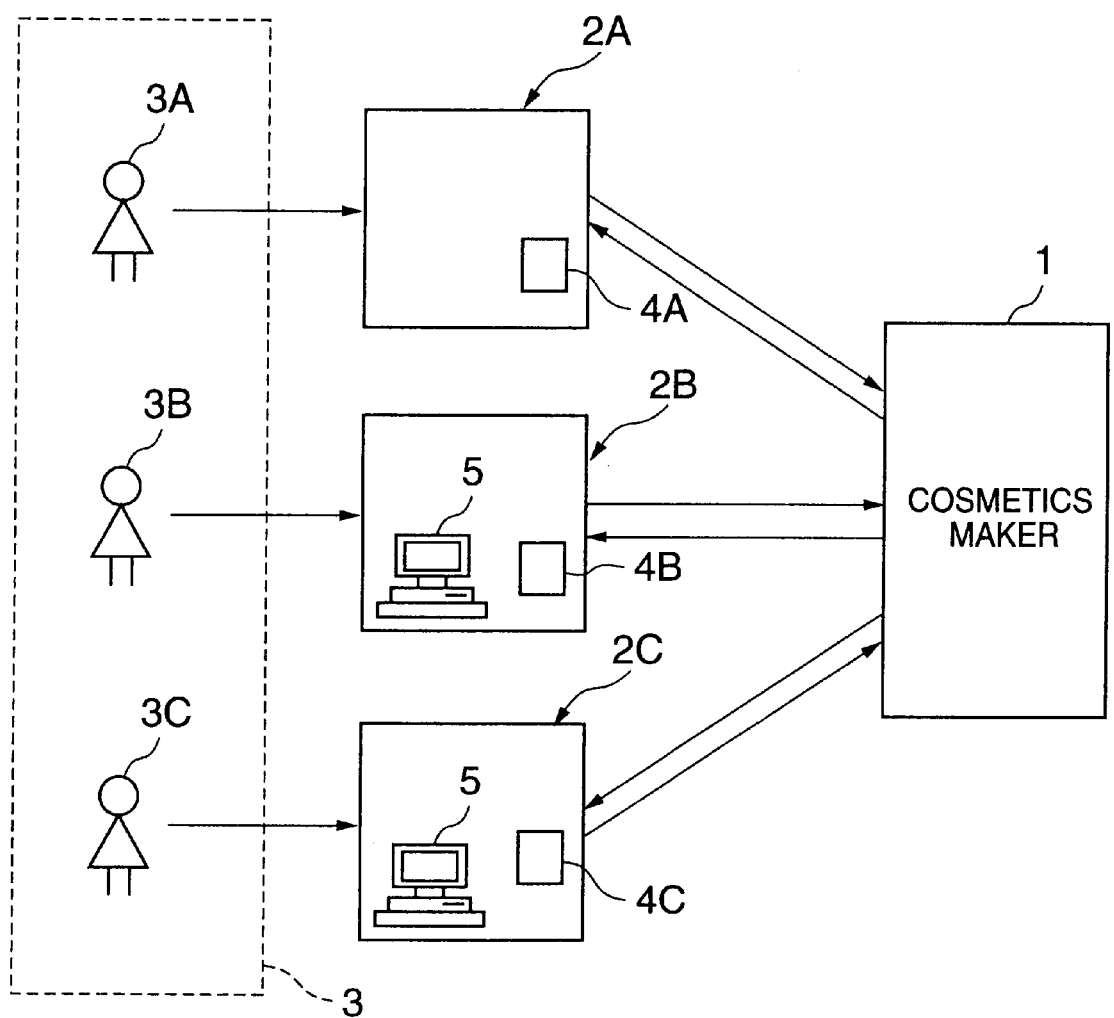
FIG. 1 is a diagram for explaining a conventional member management method.
Figure 2:
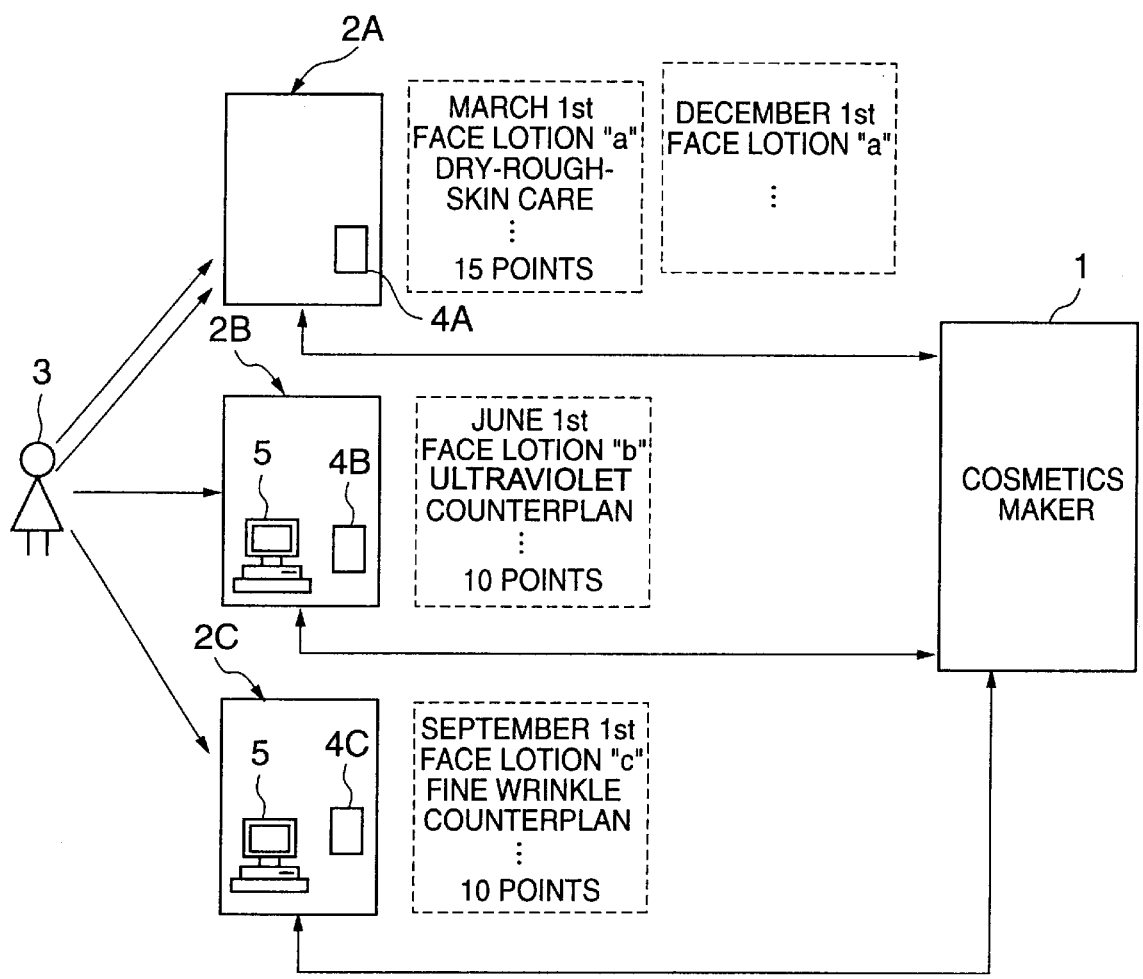
FIG. 2 is a diagram for explaining disadvantages of the conventional member management method.
Figure 3:
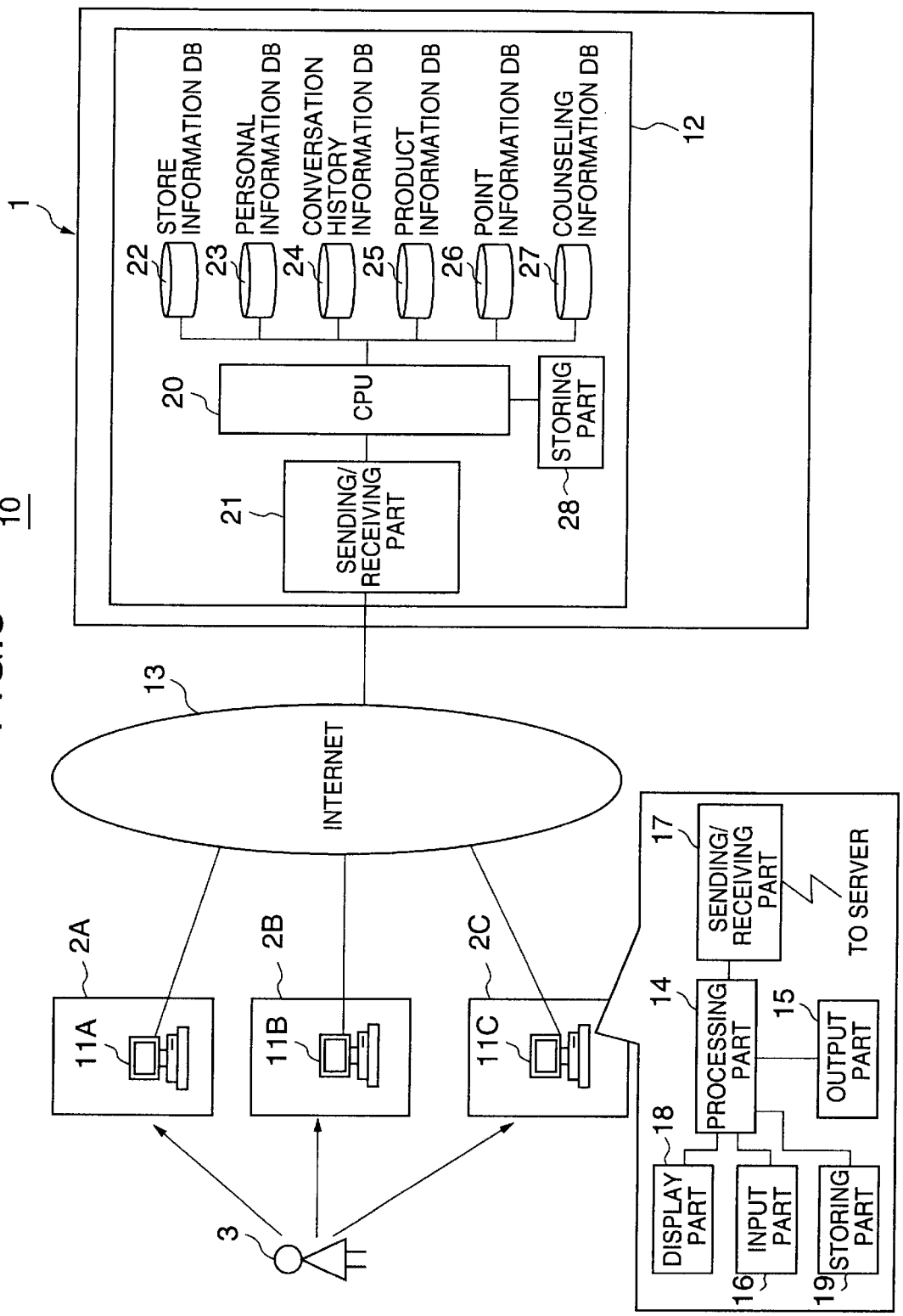
FIG. 3 is a diagram showing a system configuration of a member management system according to an embodiment of the present invention.

FIG. 3 is a diagram showing a system configuration of a member management system 10 according to the embodiment of the present invention. In this embodiment, the member management system 10 for a purchaser of cosmetics products will be illustrated. However, the member management system 10 is not limited to apply for a member management related to a cosmetics industry and can be widely applied to member managements for various products and various services.

As shown in FIG. 3, the member management system 10 includes a plurality of store terminals 11A through 11C (for the sake of convenience, three store terminals are shown in FIG. 3), a server 12, a communication network connecting each of the store terminals 11A through 11C and the server 12. In the member management system 10, the communication network can be any one of various communication networks but is defined as Internet 13 in this embodiment.

The store terminals 11A through 11C are provided in stores selling products, respectively. In this case, the member management system 10 is not limited to any style or type of each of the stores 2A through 2C. The member management system 10 can be applied to any style or type of a private store, a pharmaceutical store, a department store, and a like. Also, in the embodiment, the Internet 13 is used as the communication network. Then, it is possible to reduce costs related to an infrastructure of the member management system 10.

Each of the store terminals 11A through 11C includes a processing part 14, an output part 15, an input part 16, a sending/receiving part 17, a display part 18, and a storing part 19. In the storing part 19, the processing part 14 conducts processes necessary to manage members by executing programs. The processing part 14 entirely controls the output part 15, the input part 16, the sending/receiving part 17, the display part 18, and the storing part 19.

The output part 15 is a printer, for example, and conducts a printing process. The input part 16 is a keyboard, for example, and is used to conduct an input process for inputting various data necessary for the member management. The sending/receiving part 17 is used to send and receive data by connecting the processing part 14 to the Internet 13. The display part 18 is a CRT (Cathode-Ray Tube) display, for example, and displays data input from the input part 16 and various information sent from the server 12.

On the other hand, the server 12 is provided to the cosmetics maker 1. The server 12 includes a CPU (Central Processing Unit) 20, a sending/receiving part 21, a store information database 22 (hereinafter, called DB as a database), a personal information DB 23, a conversation history information DB 24, a product information DB 25, a point information DB 26, a counseling information DB 27, a storing part 28, and a like.

The CPU 20 stores various information sent from each of the store terminals 11A through 11C to the databases 22 through 27, by executing various programs (described later) stored in the storing part 28, and also the CPU 20 searches for required information from the databases 22 through 27 in response to each of the store terminals 11A through 11C. Then, the CPU 20 sends processed information to each of the store terminals 11A through 11C via the sending/receiving part 21.

A store ID for each of stores 2A through 2C is stored in the store information DB 22. However, each of the stores 2A through 2C can be identified by the store ID.

Personal information is stored in the personal information DB 23. The personal information includes various information related to the customer 3 as a member such as a name, contact information, attributes (birthday, Miss/Mrs., occupation, days off, and a like), hobby, yes or no of skin trouble, request for skin care, and a like. The personal information is created for each member 3 at a time of the member registration and is stored at an address indicated by the member ID in the personal information DB 23.

When the member 3 visits any one of the stores 2A through 2C, conversation history information showing conversation between the salesperson for each of the stores 2A through 2C and the customer 3 is stored in the conversation history information DB 24. The conversation history information is recent life information of the customer 3 which information is obtained when the salesperson services the customer 3. The conversation history information is also stored at the address indicated by the member ID in the conversation history information DB 24.

When the customer 3 visits any one of the stores 2A through 2C and purchases a product, product information related to the product is stored in the product information DB 25. In detail, a purchase date and time, a product type, a product price, and a like are stored. The product information is also stored at the address indicated by the member ID in the product information DB 25.

Point information showing the purchase points for the customer 3 are stored in the point information DB 26 by corresponding to the product price of the product purchased at any one of the stores 2A through 2C. In general, as an advantage for the member registration, points corresponding to a purchase amount of the product purchased by the customer 3 is accumulated and the point reserve service is provided to offer special discounts from the product price, or exchange with a gift or a coupon depending on accumulated points. The point is added based on the product purchased to accumulate and the point information showing total points are stored in the point information DB 26. The point information is stored at the address indicated by the member ID in the point information DB 26.

When the customer 3 visits any one of the stores 2A through 2C as a member, counseling information, which shows a counseling content that the salesperson counseled the customer 3 about, is stored in the counseling information DB 27. In detail, the counseling information includes advice from the salesperson to the customer 3 about a question (for example, the customer 3 wants to get a suntan but worries about freckles.) from the customer 3. The counseling information is stored at the address indicated by the member ID in the counseling information DB 27.

It should be noted that member information in claims includes the personal information, the conversation history information, the product information, the point information, and the counseling information.

In the embodiment, the customer 3 may directly communicate with the server 12 by using a communication tool of the customer 3. However, in the embodiment, the present invention has a feature of sending and receiving information between the stores 2A through 2C and the server 12. Accordingly, an explanation of a process, in which the customer 3 and the server 12 directly communicate with each other to send and receive information, is omitted.

A member management process of the member management system 10 in the system configuration shown in FIG. 3 will now be described. Hereinafter, if it is not necessary to distinguish each of the stores 2A through 2C and each of the store terminals 11A through 11C, each of the stores 2A through 2C is generally called a store 2 and each of the store terminals 11A through 11C is generally called as a store terminal 11.

Figure 4:
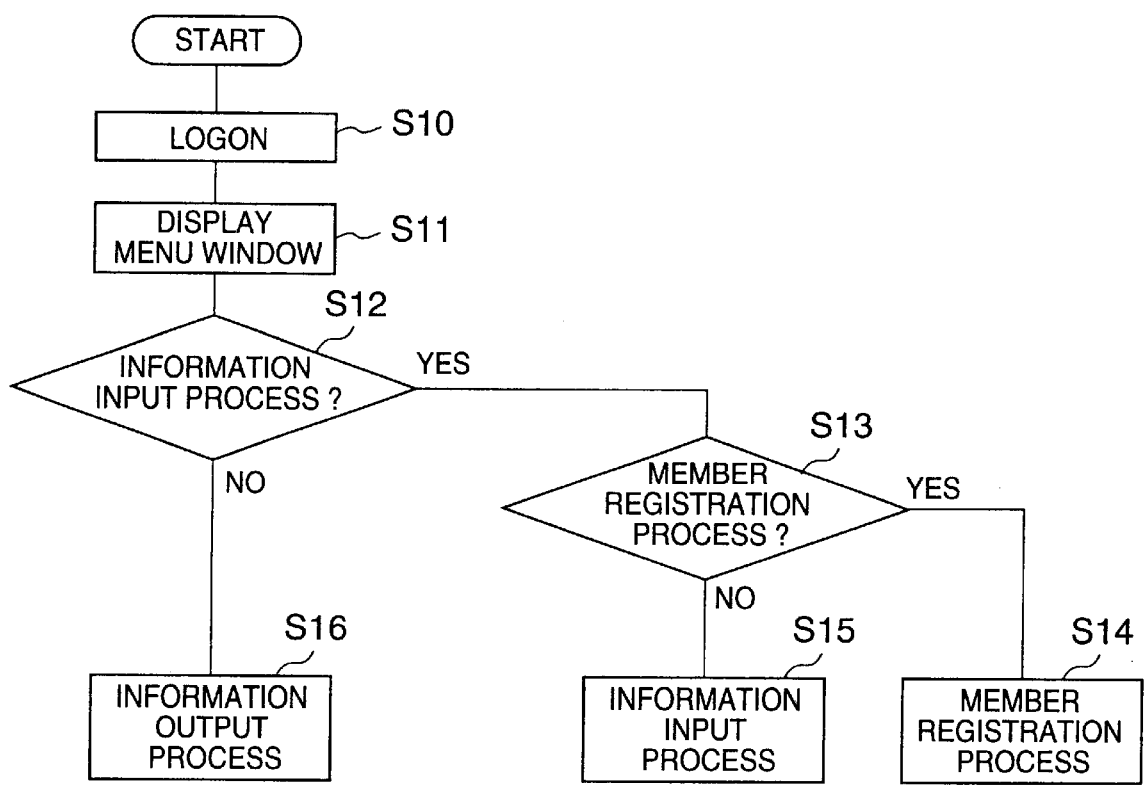
FIG. 4 is a flowchart for explaining the execute program selecting process.

The store terminal 11 provided in the store 2 conducts a member registration process, an information input process, and an information output process. When the store terminal 11 is executed, the processing part 14 executes an execute program selecting process stored in the storing part 19. FIG. 4 is a flowchart for explaining the execute program selecting process. When the execute program selecting process is executed, the processing part 14 conducts a logon process in step S10.

In the logon process, the store terminal 11 is connected to the server 12 based on the store ID and a password input by the customer 3. Thus, the store terminal 11 is connected to the server 12 via the Internet 13. A connection between the store terminal 11 and the server 12 via the Internet 13 is began before the store 2 opens and is maintained until the store 2 closes and the salesperson logs off the store terminal 11.

When the logon process is completed, a menu window is displayed at the display part 18 of the store terminal 11. FIG. 11 is a diagram showing an example of the menu window.

The salesperson of the store 2 inputs a number of a desired process in the input part 16 on the menu window shown in FIG. 11.

In step S12, the processing part 14 determines whether or not the information input process is selected. When the processing part 14 determines in step S12 that the information input process is not selected (NO), the execute program selecting process advances to step S16 and the processing part 14 conducts the information output process (described later).

On the other hand, when the processing part 14 determines in step S12 that the information input process is selected (YES), the processing part 14 determines whether or not the member registration process is selected in step S13. When the processing part 14 determines in step S13 that the member registration process is selected (YES), the execute program selecting process advances to step S14 and the processing part 14 executes the member registration process (described later). On the other hand, when the processing part 14 determines in step S13 that the member registration process is not selected (NO), the execute program selecting process advances to step S15 and the processing part 14 executes the information input process (described later).

Figure 17:
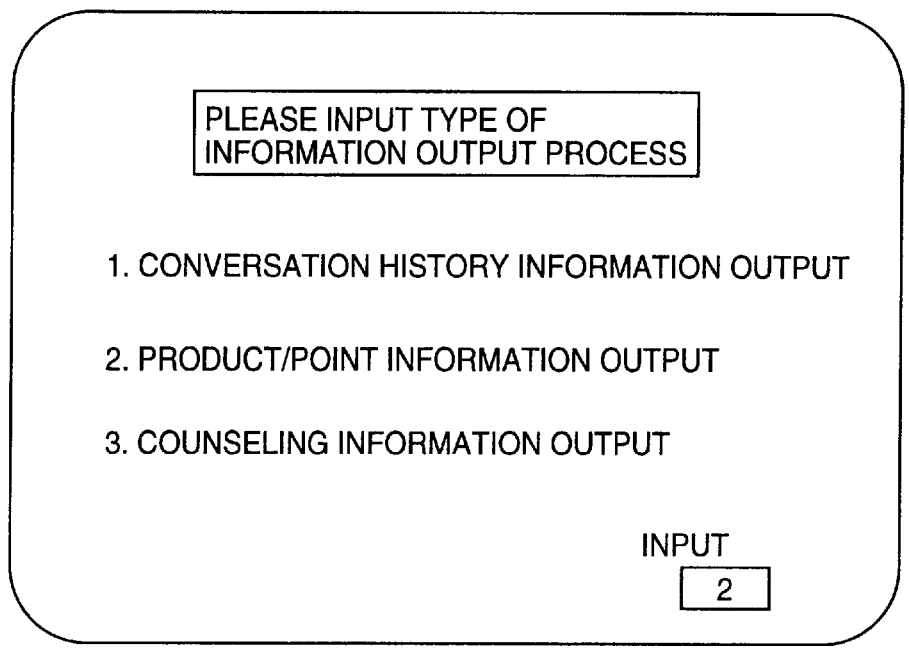
FIG. 17 is a diagram showing an example of an information output window

In the menu window shown in FIG. 17, the member registration process (step S14 of FIG. 4), which is executed when the member registration process is selected, will now be described.

Figure 5:
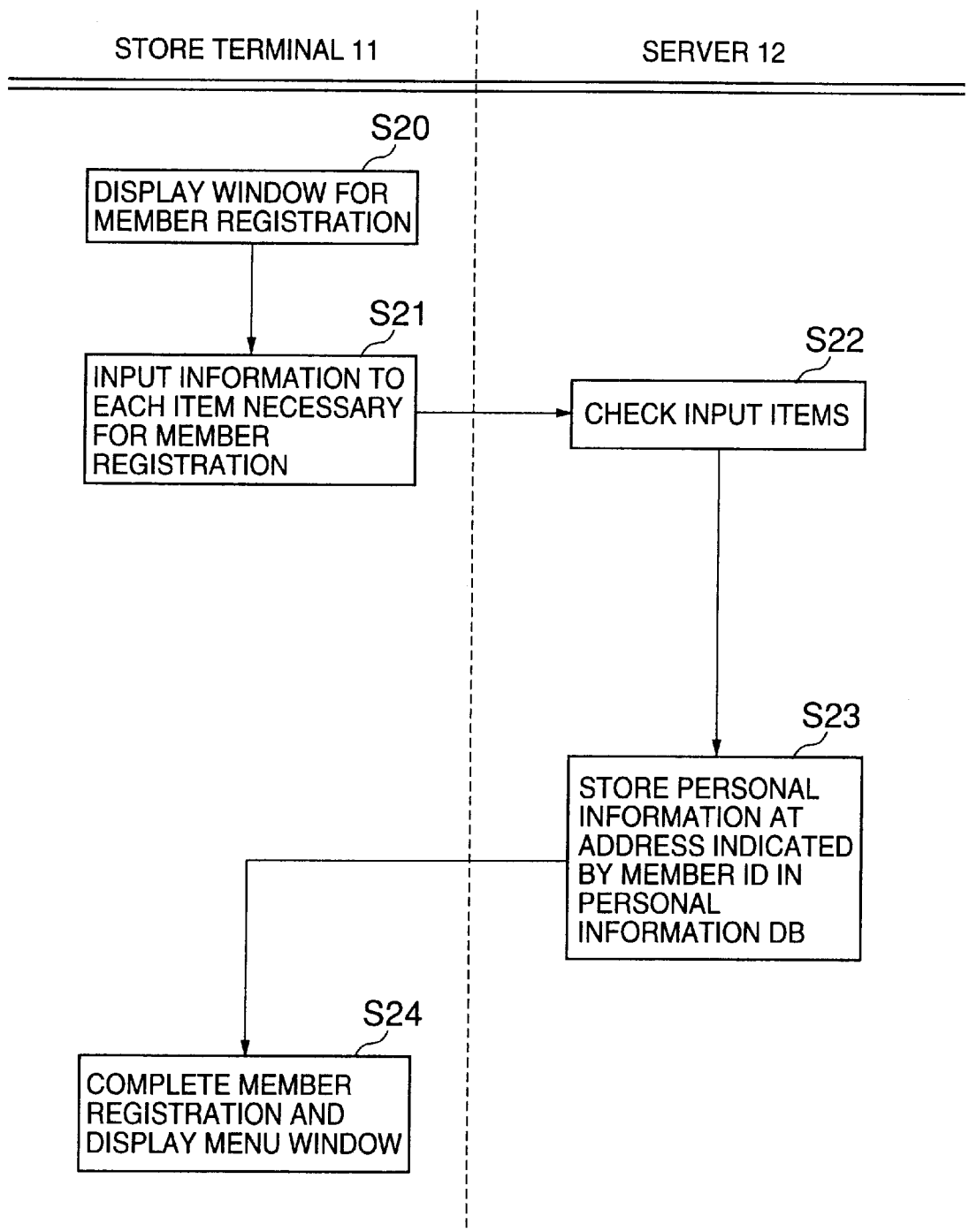
FIG. 5 is a flowchart for explaining a member registration process.

FIG. 5 is a flowchart for explaining the member registration process. In order for the customer 3 visiting the store 2 to register as a member of the cosmetics maker 1, the customer 3 fills in the member registration form. The member registration form includes items necessary for the member registration such as a name, contact information, attributes (birthday, occupation, unmarried/married, days off, and a like), hobby, yes or no of skin trouble, and a like.

In addition, a number indicating the member ID is written in the member registration form beforehand. The member ID indicated in the member registration form is a serial number. Thus, the member ID is not duplicated. Therefore, the member ID indicated in the member registration form corresponds to the member ID of the customer 3 filling out the member registration form. The salesperson of the store 2 conducts the member registration process based on the member registration form.

Referring to FIG. 5, when the member registration process is executed, the processing part 14 of the store terminal 11 displays the member registration window at the display part 18 (step S20). FIG. 12 is a diagram showing an example of the registration window.

The salesperson in the store 2 inputs data to items necessary for the member registration while referring to the member registration window shown in FIG. 12 (step S21). The items input in step S21 are related to the member ID and the personal information described above. The data input in the items is sent to the server 12 via the sending/receiving part 17.

When information related to the member registration is sent from the store terminal 11 to the server 12, the CPU 20 in the server 12 checks whether or not sent data for each item is pertinent data and all items are sent from the store terminal 11. Also, the CPU 20 matches the sent data related to the member registration with the member ID and the personal information being stored in the personal information DB 23, and the CPU 20 checks whether or not an identical or similar member ID is found or identical or similar personal information is found (in step S22).

If there is an error in the input items and the identical or similar member ID or the identical or similar personal information is found, the CPU 20 sends the store terminal 11 a message indicating that the error occurs and the CPU 20 requests to correct the error. Therefore, it is possible to prevent from duplicating the member registration for the customer 3.

When it is determined in step S22 that the sent data for each item is pertinent data, the CPU 20 stores the personal information sent from the store terminal 11 at the address indicated by the member ID in the personal information DB 23 (step S23). Thus, the personal information for the customer 3 becomes available to read in and read out the personal information DB 23 by indicating the member ID.

Furthermore, the CPU 20 forms a recording area having address identically indicated by the member ID for each of the conversation history information DB 24, the product information DB 25, the point information DB 26, and the counseling information DB 27. Accordingly, the member information necessary for the member management (the personal information, the conversation history information, the product information, the point information, the counseling information) can be read in and read out at the address indicated by the member ID in the databases 24 through 27.

The member registration process is completed by executing steps S20 through S23 described above and then the display part 18 of the store terminal 11 displays the menu window shown in FIG. 11, again (step S24).

In the menu window shown in FIG. 11, the information input process (step S15), which is executed when the information input is selected, will now be described.

Figure 6:
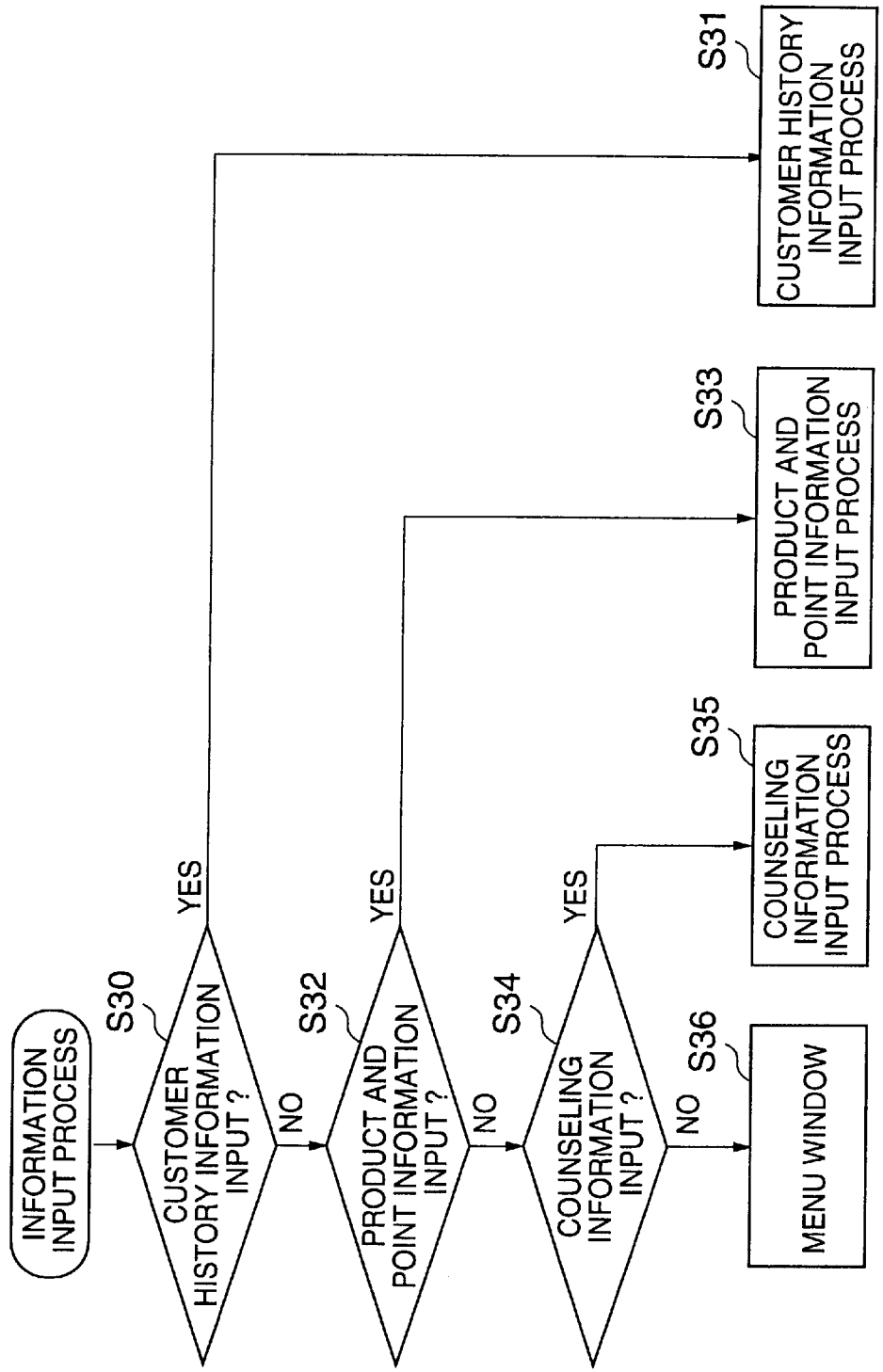
FIG. 6 is a flowchart for explaining an information input process.
Figure 13:
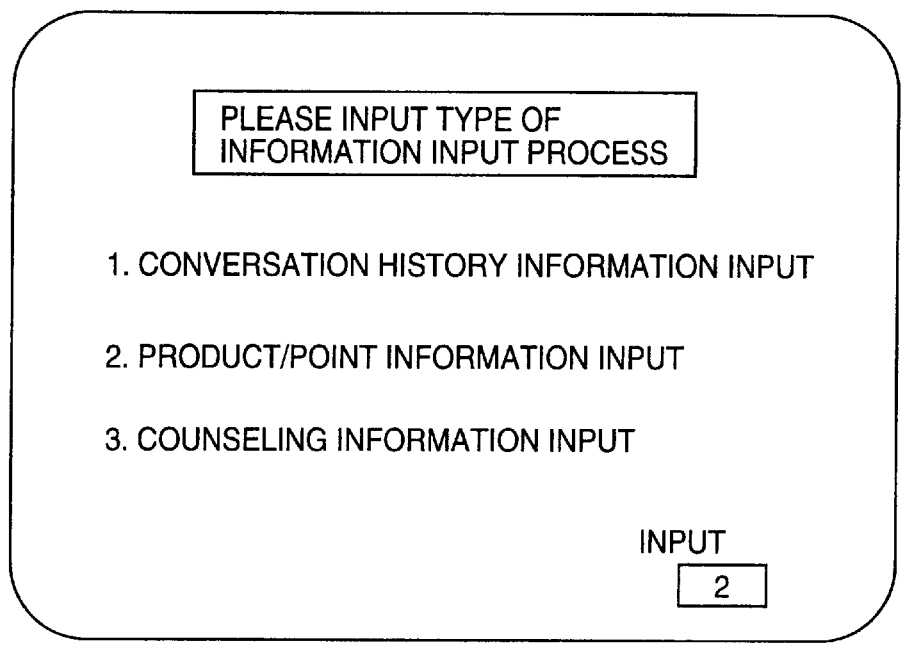
FIG. 13 is a diagram showing an example of an information input window.

When the information input process is selected by the salesperson, the processing part 14 starts the information input process. FIG. 6 is a flowchart for explaining the information input process and FIG. 13 is a diagram showing an example of an information input window. In the information input process, the member information (the conversation history information, the product information, the point information, the counseling information) other than the personal information is input.

In the information input window shown in FIG. 13, the salesperson of the store 2 inputs a number of a desired process by using the input part 16. The processing part 14 determines in step S30 whether or not the conversation history information is selected. When the processing part 14 determines that the conversation history information is selected (YES), the information input process advances to step S31 and then the conversation history information input process (described later) is executed.

On the other hand, if it is determined in step S30 that the conversation history information is not selected (NO), the processing part 14 determines in step S32 whether or not the product/point information input is selected (YES), the information input process advances to step S33 and then a product/point information input process (described later) is executed.

Since the point is set based on the product price, the point information is associated with the product information. Thus, in the embodiment, a point information input process and product information input process can be conducted in a single process (product/point information input process).

On the other hand, when it is determined in step S32 that the product/point information input is not selected (NO), the processing part 14 determines in step S34 whether or not the counseling information input is selected. When it is determined in step S34 that the counseling information input is selected (YES), the information input process advances to step S35 and then a counseling information input process is executed. On the other hand, when it is determined in step S34 that the counseling information input is not selected (NO), the processing part 14 completes the information input process shown in FIG. 6 and the display part 18 displays the menu window, again (step S36).

Each of the counseling history information input process, the product/point input process, and the counseling information process executed in the information input process will now be described.

Figure 7:
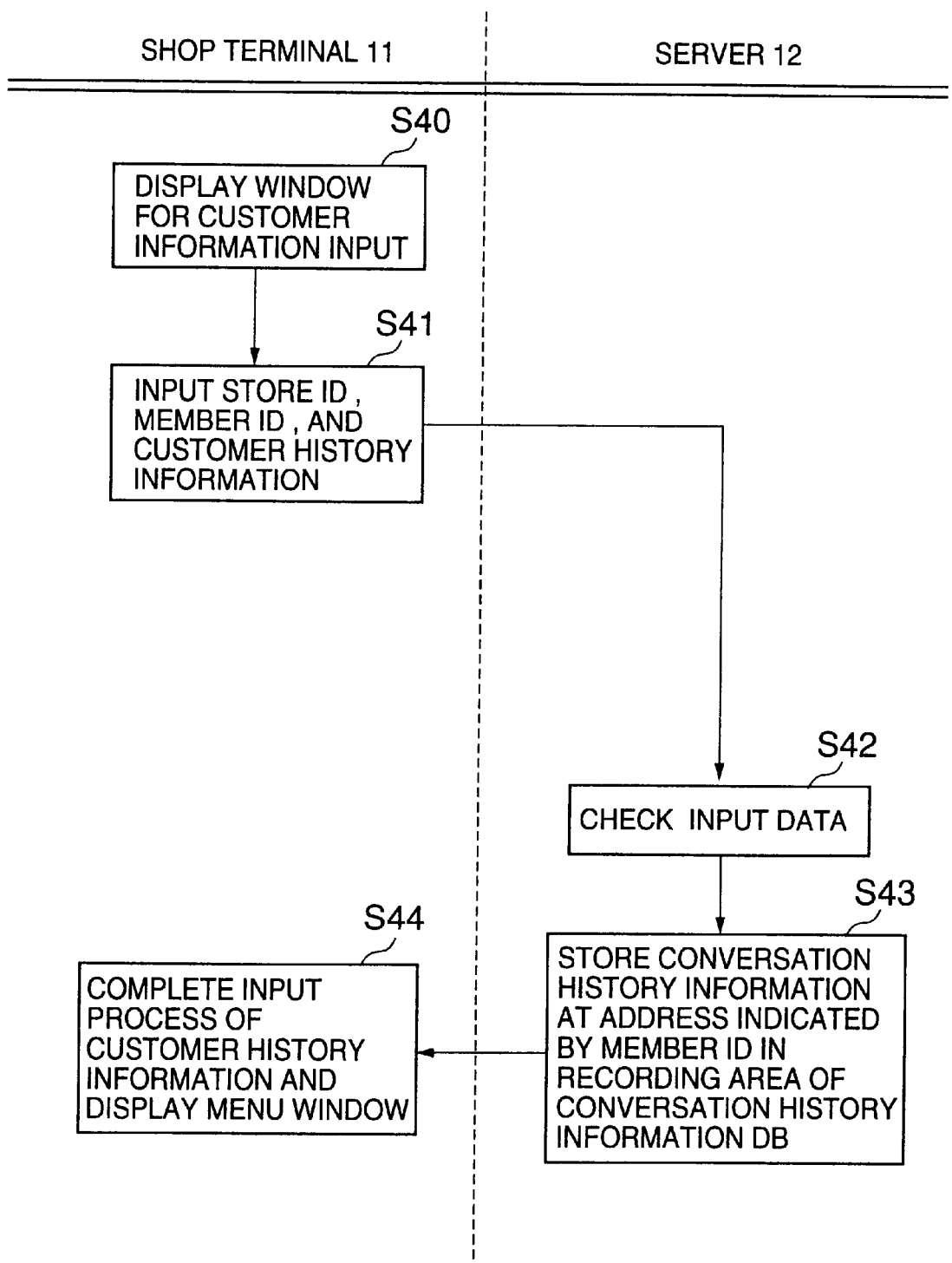
FIG. 7 is a flowchart for explaining a counseling history information input process.

First, in the information input window shown in FIG. 13, the counseling history information input process (step S31 in FIG. 6), which is executed when the counseling history information input is selected, will now be described. FIG. 7 is a flowchart for explaining the counseling history information input process and a program for the counseling history information input process is stored in the storing part 19 of the store terminal 11.

Figure 14:
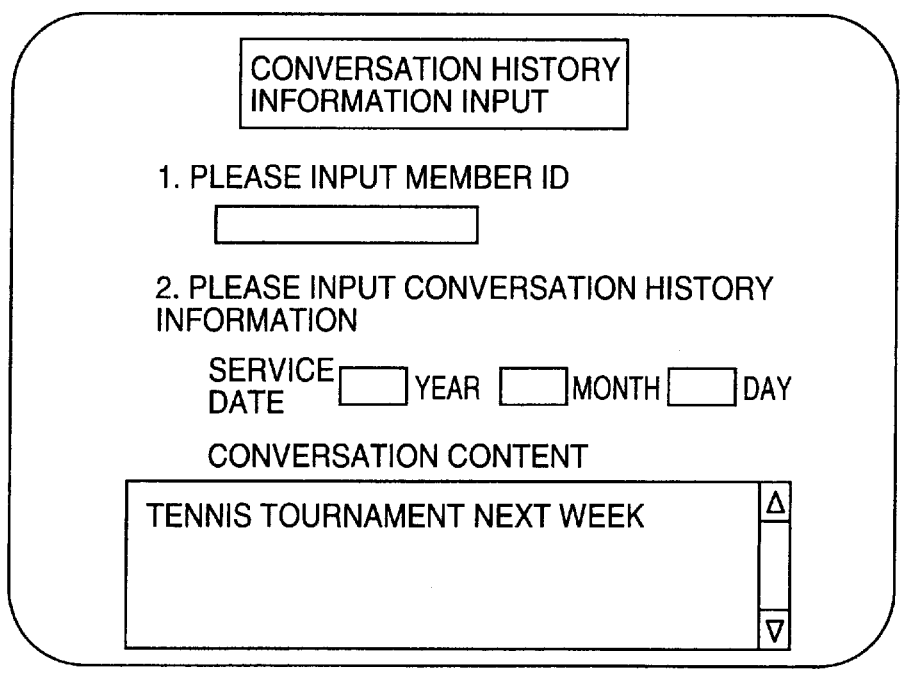
FIG. 14 is a diagram showing an example of a counseling history information input window.

When the counseling history information input process shown in FIG. 7 is executed, the processing part 14 of the store terminal 11 displays a counseling history information input window at the display part 18 (step S40). FIG. 14 is a diagram showing an example of the counseling history information input window.

The salesperson of the store 2 inputs the conversation history information such as the member ID of the customer 3 who the salesperson serviced, a service date, a conversation content, and a like (step S41). In detail, the service date and the conversation content are input. The conversation history information input window shown in FIG. 14 is configured so as to directly input a sentence as the conversation content. Alternatively, items showing several conversation contents are listed and the salesperson selects one item to input. When the member ID and the conversation history information are input, the processing part 14 sends the member ID and the conversation history information to the server 12 via the sending/receiving part 17.

When the conversation history information input is completed in step S41, the processing part 14 provides the member ID to the conversation history information input by the salesperson and then sends to the server 12. The CPU 20 of the server 12 checks whether or not the conversation history information sent from the store terminal 11 is pertinent and all items are sent from the store terminal 11 (step S42). Not shown in FIG. 6, if there is an error in the input items, the CPU 20 sends the store terminal 11 a message indicating that the error occurs and the CPU 20 requests to correct the error.

When it is determined in step S42 that the conversation history information is properly sent, the CPU 20 stores the conversation history information input in step S41 to a recording area corresponding to the member ID as an address in the conversation history information DB 24. Accordingly, the conversation history information stored in the conversation history information DB 24 can be retrieved from the conversation history information DB 24 by indicating the member ID.

The conversation history information input process is completed by executing steps S40 through 43 and then the display part 18 of the store terminal 11 displays the menu window shown in FIG. 11, again (step S44).

In the information input window in FIG. 13, the product/point information input process (step S33 in FIG. 6), which is executed when the product/point information input is selected, will now be described. FIG. 8 is a flowchart for explaining the product/point information input process and a program for the product/point information input process is stored in the storing part 19 of the store terminal 11.

When the product/point information input process shown in FIG. 8 is executed, the processing part 14 of the store terminal 11 displays a product/point information input window at the display 18 (step S50). FIG. 15 is a diagram showing an example of the product/point information input window.

The salesperson of the store 2 inputs the product information and the point information such as the member ID of the customer 3 who purchased the product, a product purchase date, a purchase list, and a like by using the input part 16 (step S51). As described above, the points are defined based on the product price and determined for each product. A relationship between the product and the points is stored in the storing part 19 of the store terminal 11. Therefore, in the embodiment, by inputting information of a purchased product in the purchase list, the points for the purchased product is searched for from the storing part 19 and then the points for the purchased product is automatically displayed by corresponding to the information of the purchased product.

When the product/point information input is completed in step S51, the processing part 14 provides the member ID to the product/point information that is input by the salesperson and then sends to the server 12. The CPU 20 of the server 12 checks whether or not the product/point information sent from the store terminal 11 is pertinent and all items are sent from the store terminal 11 (step S52). Not shown in FIG. 8, if there is an error in the input items, the CPU 20 sends the store terminal 11 a message indicating that the error occurs and the CPU 20 requests to correct the error.

When it is determined in step S52 that the product/point information is properly sent, the CPU 20 stores the product/point information input in step S51 to a recording area corresponding to the member ID as an address in the product information DB 25 and the point information DB 26.

Accordingly, the product information stored in the product information DB 25 can be retrieved from the product information DB 25 by indicating the member ID. The point information stored in the point information DB 26 can be retrieved from the point information DB 26 by indicating the member ID.

The product/point information input process is completed by executing steps S50 through 53 and then the display part 18 of the store terminal 11 displays the menu window shown in FIG. 11, again (step S54).

In the information input window in FIG. 13, the counseling information input process (step S35 in FIG. 6), which is executed when the counseling information input is selected, will now be described. FIG. 9 is a flowchart for explaining the counseling information input process and a program for the counseling information input process is stored in the storing part 19 of the store terminal 11.

When the counseling information input process shown in FIG. 9 is executed, the processing part 14 of the store terminal 11 displays a counseling information input window at the display 18 (step S60). FIG. 16 is a diagram showing an example of the counseling information input window.

The salesperson of the store 2 inputs the counseling information such as the member ID of the customer 3 whom the salesperson counseled, a counseling date, a counseling content, and a like by using the input part 16 (step S61).

When the counseling input is completed in step S61, the processing part 14 provides the member ID to the counseling information that is input by the salesperson and then sends to the server 12. The CPU 20 of the server 12 checks whether or not the counseling information sent from the store terminal 11 is pertinent and all items are sent from the store terminal 11 (step S62). Not shown in FIG. 9, if there is an error in the input items, the CPU 20 sends the store terminal 11 a message indicating that the error occurs and the CPU 20 requests to correct the error.

When it is determined in step S62 that the counseling information is properly sent, the CPU 20 stores the counseling information input in step S61 to a recording area corresponding to the member ID as an address in the counseling information DB 27.

The counseling information input process is completed by executing steps S60 through 63 and then the display part 18 of the store terminal 11 displays the menu window shown in FIG. 11, again (step S64).

In the embodiment as described above, the member information (the personal information, the conversation history information, the product information, the point information, the counseling information), which is related to the customer 3 and sent from the store terminal 11, is stored and centralized in respective databases 23 through 27 for each customer registered as a member.

As shown in FIG. 3, even if the customer 3 visits different stores 2A through 2C and conversation, product purchases, the points and counseling are provided, entire information related to the conversation, the product purchases, the points and the counseling is sent from the stores 2A through 2C to the server 12 to centralize and manage, instead of managing each information at each of the stores 2A through 2C. Accordingly, the entire information related to the conversation, the product purchases, the points and the counseling are not distributed into the stores 2A through 2C.

In the menu window shown in FIG. 11, the information output process (step S16 of FIG. 4), which is executed when information output process is selected, will now be described.

When the information output process is selected, the processing part 14 starts the information output process. FIG. 10 is a flowchart for explaining the information output process. In the information output process, in response to an output request from the store terminal 11, the CPU 20 of the server 12 reads out the member information from the databases 22 through 27 and sends the member information to the store terminal 11.

That is, when the information output process shown in FIG. 10 is executed, the salesperson of the store 2 inputs the member ID of the customer 3 to obtain the member information by using the input part 16. The member ID is sent with an information output request signal to the server 12 via the sending/receiving part 17 and the Internet 13.

When the information output signal and the member ID are sent from the store terminal 11, the server 12 reads out the member information (the conversation history information, the product information, the point information, and the counseling information) from the conversation history information DB 24, the product information DB 25, the point information DB 26, and the counseling information DB 27, and then sends the member information as a whole to the store 2 of the store terminal 11 that sent the information output request signal.

As described above, the conversation history information, the product information, the point information, and the counseling information forming the member information are stored at the address indicated by the member ID in the conversation history information DB 24, the product information DB 25, the point information DB 26, and the counseling information DB 27 for each registered customer as a member, so as to be centralized in the server 20. Therefore, even in a case in which the customer 3 having the member ID purchases products separately at the stores 2A through 2C and different conversation and different counseling are provided at each of the stores 2A through 2C, the member information read from the databases 24 through 27 based on the member ID includes entire member information (conversation history information, the product information, the point information, and the counseling information) input at each of the stores 2A through 2C.

When the member information is sent from the server 12 to the store terminal 11, the processing part 14 stores the member information in the storing part 19 in step S71. When a storing process is completed, the processing part 14 displays an information output window shown in FIG. 17 at the display part 18.

Figure 18:
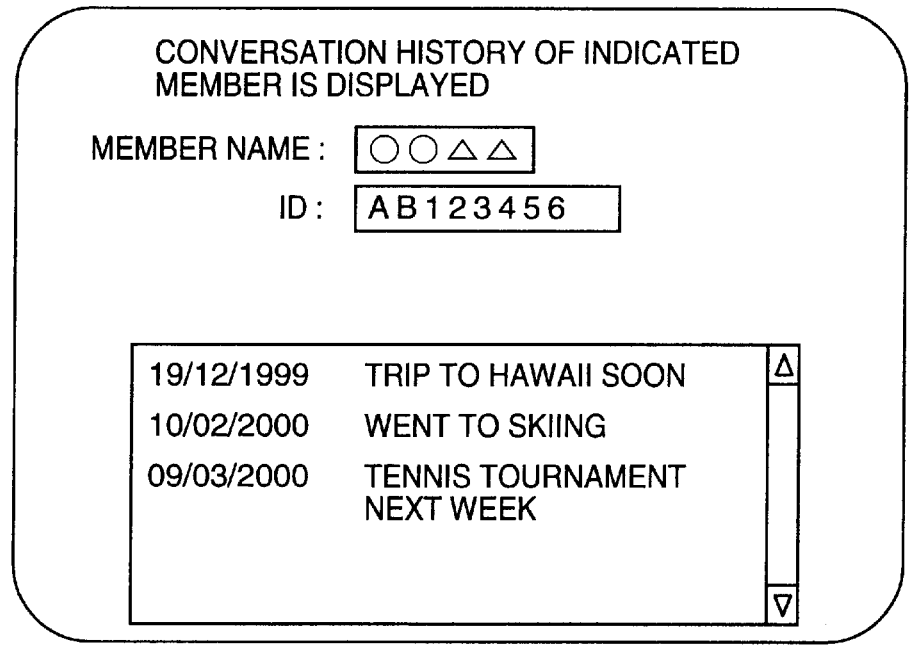
FIG. 18 is a diagram showing an example of a conversation history information window displayed at the display part.

The salesperson of the store 2 inputs a number of a desired output process to execute by using the input part 16. The processing part 14 determines whether or not the conversation information output is selected, in step S72. When it is determined that the conversation information output is selected (YES), the information output process advances to step S73. And, the information output process reads the conversation history information from the storing part 19 and displays the conversation history information at the display part 18. FIG. 18 is a diagram showing an example of conversation history information window displayed at the display part 18. In this case, in the conversation history information window of FIG. 18, entire conversation history information when the customer 3 had conversations at the stores 2A through 2C is displayed.

On the other hand, when it is determined in step S72 that the conversation information output is not selected (NO), the processing part 14 determines whether or not the product/point information output is selected in step S74. Then, when it is determined that the product/point information output is selected (YES), the information output process advances to step S75, read the product/point information from the storing part 19, and displays the product/point information at the display part 18. FIG. 19 is an example of the product/point information output window displayed at the display part 18. In this case, in the product/point information output window at the display part 18, all product/point information related to the products that the customer 3 purchased at the stores 2A through 2C is displayed. And, the points accumulated based a total purchase amount of the products purchased at the stores 2A through 2C is displayed.

As described above, since the point information and the product information is related each other, an output process for the point information and an output process for the product information are conducted in a single output process (product/point information output process) in the embodiment.

On the other hand, when it is not determined that the product/point information output is selected (NO), the processing part 14 determines whether or not the counseling information output is selected, in step 76. When it is determined that the counseling information output is selected (YES), the information output process advances to step S77, reads the counseling information from the storing part 19, and displays the counseling information at the display part 18. FIG. 20 is a diagram showing an example of a counseling information output window displayed at the display part 18. In this case, in the counseling information output window in FIG. 20, entire counseling information related in which the customer 3 had counseling at each of the stores 2A through 2C is displayed.

On the other hand, when it is determined that the counseling information output is not selected (NO), the processing part 14 completes the information output process shown in FIG. 10 and returns the menu window at the display part 18 (step S78).

As described above, in the embodiment, the member information (the personal information, the conversation history information, the product information, the point information, the counseling information), which is related to the customer 3 and sent from the store terminal 11, is stored at the address indicated by the member ID and centralized in respective databases 23 through 27 for each customer registered as a member. Thus, in a case in which the member information is output, all information related to the conversation and the counseling in which the salesperson serviced the customer 3 at each of the stores 2A through 2C, and the product and the points provided when the customer 3 purchased the product.

In detail, when the member information of the customer 3 is output at the store 2A of FIG. 3, a output result includes the conversation information and the counseling information which the customer is serviced by, and the product information and the point information provided when the customer 3 purchased the product. Therefore, for example, in a case in which the salesperson of the store 2A counsels the customer 3, it is possible for the salesperson to consider the counseling content in that the customer 3 wad counseled and the products that the customer 3 purchased at the stores 2B and 2C and to properly counsel the customer 3 at the store 2A. Moreover, it is possible to conduct more accurate counseling for the customer 3. And, it is possible to conduct more proper conversation and service for the customer 3.

Furthermore, in a case in which the customer 3 purchased products separately at each of the stores 2A through 2C, the points accumulated at each of the stores 2A through 2C every time the customer purchased the product can be seen at the store terminal 11 of each of the stores 2A through 2C. Accordingly, it is possible to improve the point reduction service for the customer 3.

In the embodiment, as the member information related to the customer 3, the personal information, the conversation information, the product information, the point information, and the counseling information are exampled. Alternatively, instead of using all information above, necessary information can be selectively used. Also, not shown in the embodiment but other information can be additionally provided in the member information.

In the embodiment, the present invention is applied to the member management related to the cosmetics product but is not limited thereto. Alternatively, the present invention can be applied to any types of the member management.

According to the present invention, the following various advantages can be realized.

Even if the member information related to the same member (registered customer) is input and sent to the server separately at each of a plurality of stores, it is possible to avoid duplicating the member information and then it is possible to improve the accuracy of the member information.

The conversation history information is centralized and managed in the conversation history information database for each member. Thus, even if the member is serviced at the plurality of stores, information showing conversation content at each of the stores is not managed separately. Consequently, various services conducted to the member can be rationalized.

The product information of the product that the member purchased is centralized and stored in the product information database for each member. Even if the member purchased products at a plurality of different stores, the product information is not managed separately at each of the different stores. Therefore, it is possible to rationalize various services for the member.

Even if the member had counseling at the plurality of different stores, the counseling information is not managed separately at each of the different stores but the counseling information is centralized and managed in the server. Therefore, when the member visits at any one of the different stores, the counseling content for the member can be seen at other different stores. Consequently, it is possible to conduct proper counseling to the member.

The present invention is not limited to the specifically disclosed embodiments, variations and modifications, and other variations and modifications may be made without departing from the scope of the present invention.

The present application is based on Japanese Priority Application No. 2000-350226 filed on Nov. 16, 2000, the entire contents of which are hereby incorporated by reference.

What is claimed is:

1. A system for managing members comprising:

a plurality of store terminals provided to a plurality of stores, respectively, in which customers purchase a product; and a server for managing member information of registered customers of said customers, said registered customer being registered as said members, wherein:

said store terminal comprises:

a part conducting a member registration for said customers;

a part obtaining said member information of said members;

a part requesting said member information of said server; and a part outputting said member information sent from said server that corresponds to a request of said member information, said server comprises:

a store information database storing store information of each of said plurality of stores;

a member information database storing said member information;

a part centralizing and storing said member information sent from said plurality of stores for each of said members in said member information database; and a part sending said member information stored in said member information database to a store of said plurality of stores based on said request from a store terminal of said store, said store terminal being one of said plurality of store terminals.

2. The system claimed in claim 1, wherein said member information includes personal information specifying said member.

3. The system claimed in claim 1, wherein said member information includes conversation history information showing a conversation content for said member.

4. The system claimed in claim 1, wherein said member information includes point information of points provided based on product purchase amount of said member.

5. The system claimed in claim 1, wherein said member information includes product information of said product that said member purchased.

6. The system claimed in claim 1, wherein said member information includes counseling information showing a counseling content for said member.

* * * * *